US009654338B2

(12) United States Patent
Joe et al.

(10) Patent No.: US 9,654,338 B2
(45) Date of Patent: May 16, 2017

(54) CPE DEVICE INSTALLATION AND OPERATION

(71) Applicant: Verizon Patent and Licensing Inc., Arlington, VA (US)

(72) Inventors: Brian W. Joe, Irvine, CA (US); Ashay Chaudhary, Redmond, WA (US); Sandeep Sharma, Fremont, CA (US); Ray A. Sears, Capitola, CA (US); Yaojun Zeng, San Jose, CA (US)

(73) Assignee: Verizon Digital Media Services Inc., Playa Vista, CA (US)

( * ) Notice: Subject to any disclaimer, the term of this patent is extended or adjusted under 35 U.S.C. 154(b) by 60 days.

(21) Appl. No.: 14/665,874

(22) Filed: Mar. 23, 2015

(65) Prior Publication Data

US 2016/0286417 A1    Sep. 29, 2016

(51) Int. Cl.
*H04L 12/24* (2006.01)
*H04W 60/00* (2009.01)
*H04W 88/10* (2009.01)
*H04W 24/02* (2009.01)
*H04B 10/07* (2013.01)

(52) U.S. Cl.
CPC ......... *H04L 41/0668* (2013.01); *H04B 10/07* (2013.01); *H04W 24/02* (2013.01); *H04W 60/005* (2013.01); *H04W 88/10* (2013.01); *Y02B 60/50* (2013.01)

(58) Field of Classification Search
CPC combination set(s) only.
See application file for complete search history.

(56) References Cited

U.S. PATENT DOCUMENTS

| | | | | |
|---|---|---|---|---|
| 2003/0035399 A1* | 2/2003 | Ishibashi | ............... | H04W 28/18 370/338 |
| 2003/0147395 A1* | 8/2003 | Gutknecht | .......... | H04L 12/2898 370/393 |
| 2004/0258051 A1* | 12/2004 | Lee | ..................... | H04L 12/4011 370/352 |
| 2005/0153683 A1* | 7/2005 | Gustafsson | ............. | H04L 29/06 455/411 |
| 2007/0064702 A1* | 3/2007 | Bates | ...................... | H04L 45/02 370/392 |
| 2008/0232259 A1* | 9/2008 | Thomson | ............... | H04W 88/08 370/242 |
| 2011/0261792 A1* | 10/2011 | Oerton | ................ | H04M 1/2535 370/335 |
| 2012/0072552 A1* | 3/2012 | Friedlander | ......... | H04L 41/0806 709/220 |
| 2012/0236759 A1* | 9/2012 | Huang | .................... | H04W 8/24 370/256 |

(Continued)

*Primary Examiner* — Steven Kelley
(74) *Attorney, Agent, or Firm* — Los Angeles Patent Group; Arman Katiraei (57) ABSTRACT

Techniques described herein may be used to provide a self-installing customer premise equipment (CPE) device that is capable of automatically registering with, and participating in, a network of CPE devices in response to being powered on. The CPE device may be capable of logically combining a connection with a wireless cellular network and a wired network to increase bandwidth and reliability. The CPE device may also detect a power failure and report the power failure to a centralized server in order to facilitate the diagnosis and correction of performance issues caused by the power failure.

11 Claims, 11 Drawing Sheets

(56) References Cited

U.S. PATENT DOCUMENTS

2012/0329455 A1* 12/2012 Norp .................. H04W 4/005
                                                        455/433
2016/0285703 A1* 9/2016 Joe ..................... H04L 41/5054

* cited by examiner

CPE DEVICE INSTALLATION AND OPERATION

BACKGROUND

Businesses and other types of organizations often include multiple branches, stores, offices, and/or other types of locations. Computer networks in such organizations may need to be installed so that information may be securely and efficiently communicated between the locations. Setting up such a network often includes deploying one or more network devices (referred to as customer premise equipment (CPE) devices) at the various physical locations associated with the organization. The CPE devices may collectively act to form a network, such as a private network for the organization, that spans the various physical locations Examples of CPE devices may include a router, a switch, a modem, a virtual private network (VPN) endpoint, a firewall device, a network address translation (NAT) device, a content delivery network (CDN) device, and more. The CPE devices may be managed by a third party, such as a network operator or other third party that is hired by the organization associated with the various physical locations.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may provide techniques for CPE devices that can automatically self-install in response to providing electrical power to the CPE devices; CPE devices that may logically combine distinct network connections (e.g., a wireless connection and a wired connection) for increased bandwidth and reliability; and CPE devices that may detect and report power failures to facilitate technical support efforts in recovering from the power failures.

Figure 1A:
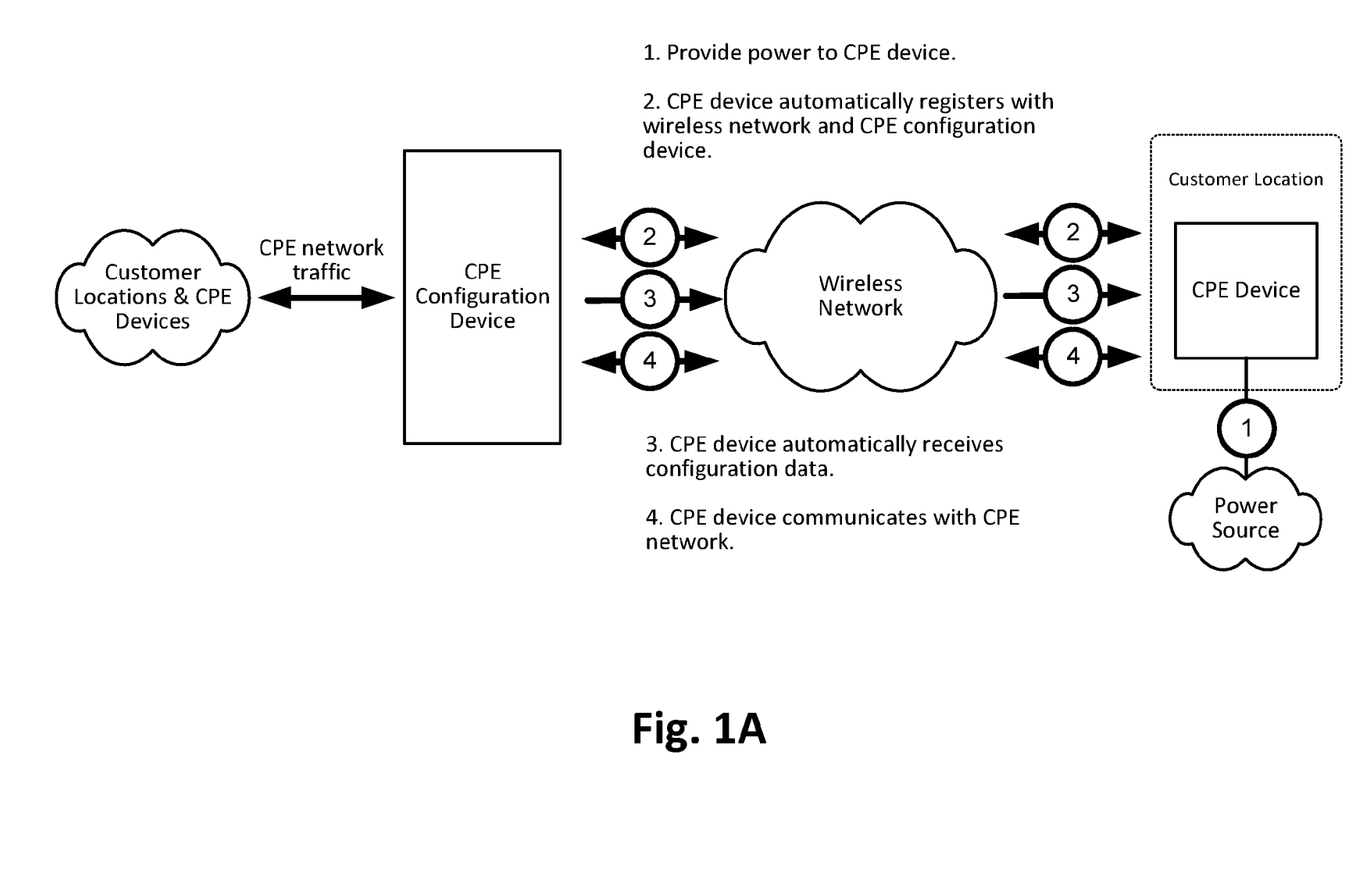
FIGS. 1A-1C illustrate an example overview of an implementation described herein.
Figure 1B:
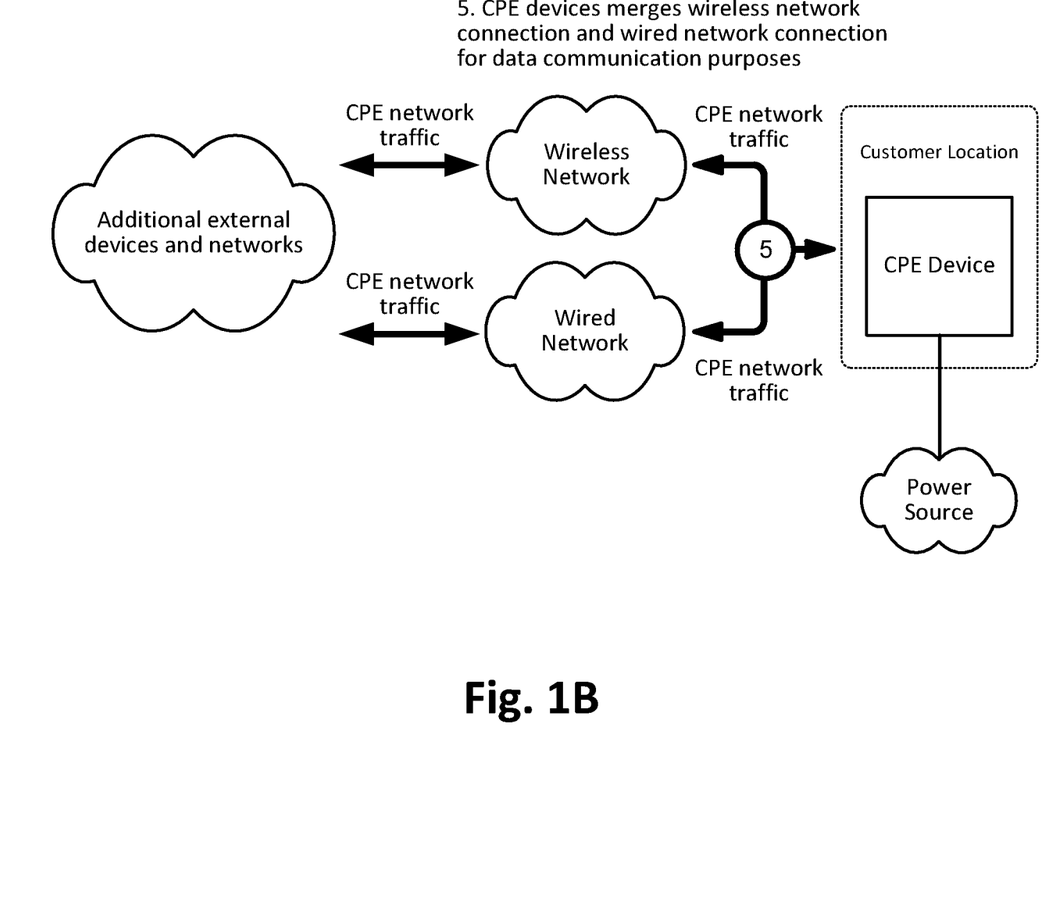
Figure 1C:
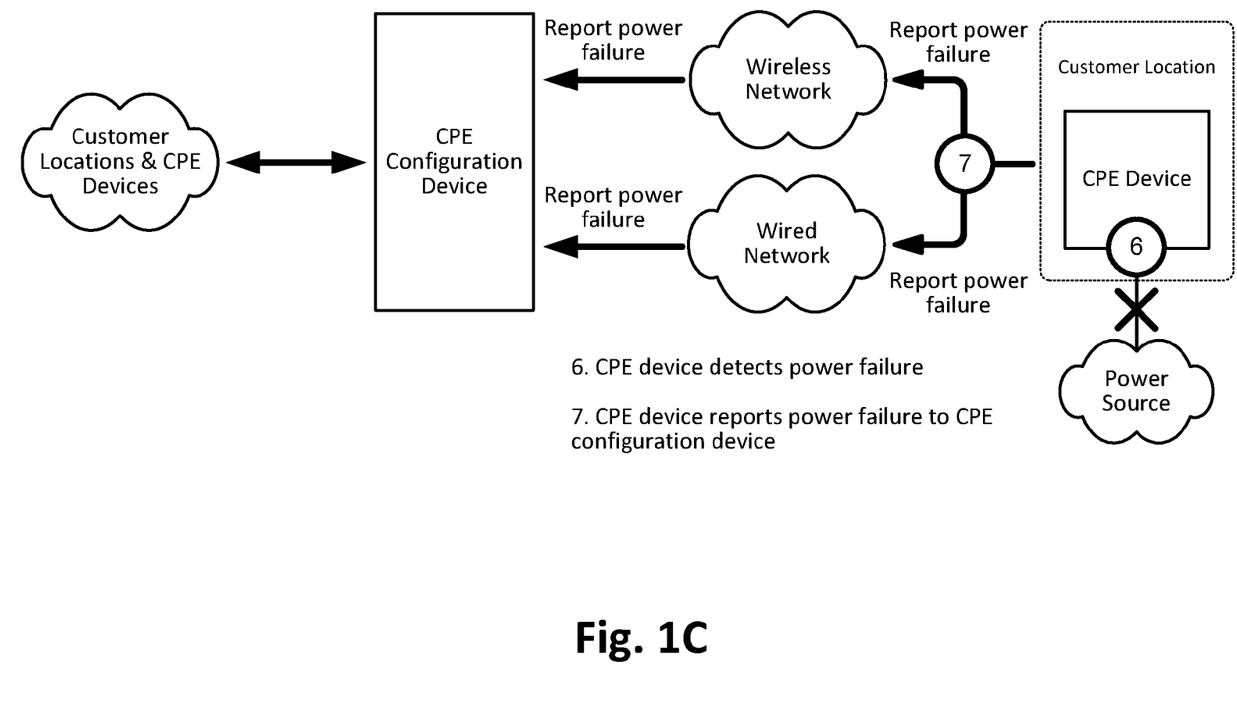

FIGS. 1A-1C illustrate an example overview of an implementation described herein. As shown in FIG. 1, a CPE device may be plugged into an electrical outlet or otherwise provided a power source (at 1). In response to the power source, the CPE device may automatically communicate with a wireless network to register with both the wireless network and a CPE configuration device (at 2). The CPE configuration device may communicate configuration information to the CPE device (at 3). The configuration information may include rules and parameters for participating in a network of CPE devices (also referred to herein as a CPE network). The CPE device may automatically self-configure in response to receiving the configuration information. Upon self-configuring, the CPE device may begin communicating with other CPE devices in the CPE network in accordance with the configuration information (at 4). As such, the CPE device may be automatically installed and configured without requiring a trained technician at the customer location.

The CPE device may communicate with the CPE network via the wireless network (as shown in FIG. 1A). However, as shown in FIG. 1B, the CPE device may also, or alternatively, communicate with the CPE network via a wired network. For instance, the CPE device may receive configuration information that causes the CPE device to logically combine the connection with the wireless network and a connection with a wired network (at 5). Doing so may provide one or more benefits, such as providing an automatic backup connection in the event that one of the connections becomes unavailable, increasing the overall bandwidth for downloading and/or uploading information, etc.

Referring now to FIG. 1C, the CPE device may be connected to a power supply (e.g., an electrical grid, a battery, etc.). The CPE device may monitor a current of the power supply in order to detect power supply failures (at 6). In response to detecting a power supply failure, the CPE device may report the power supply failure (which may include information describing the nature of the power failure, the state of the CPE device, etc.) to the CPE configuration device (at 7). Reporting the power failure to the CPE configuration device may enable a technical support specialist or a network administrator of the CPE network to rapidly ascertain that the CPE device is no longer responsive due to a power failure as opposed to another type of technical issue, which may in turn decrease the time required to get the CPE device functioning properly again.

Figure 2:
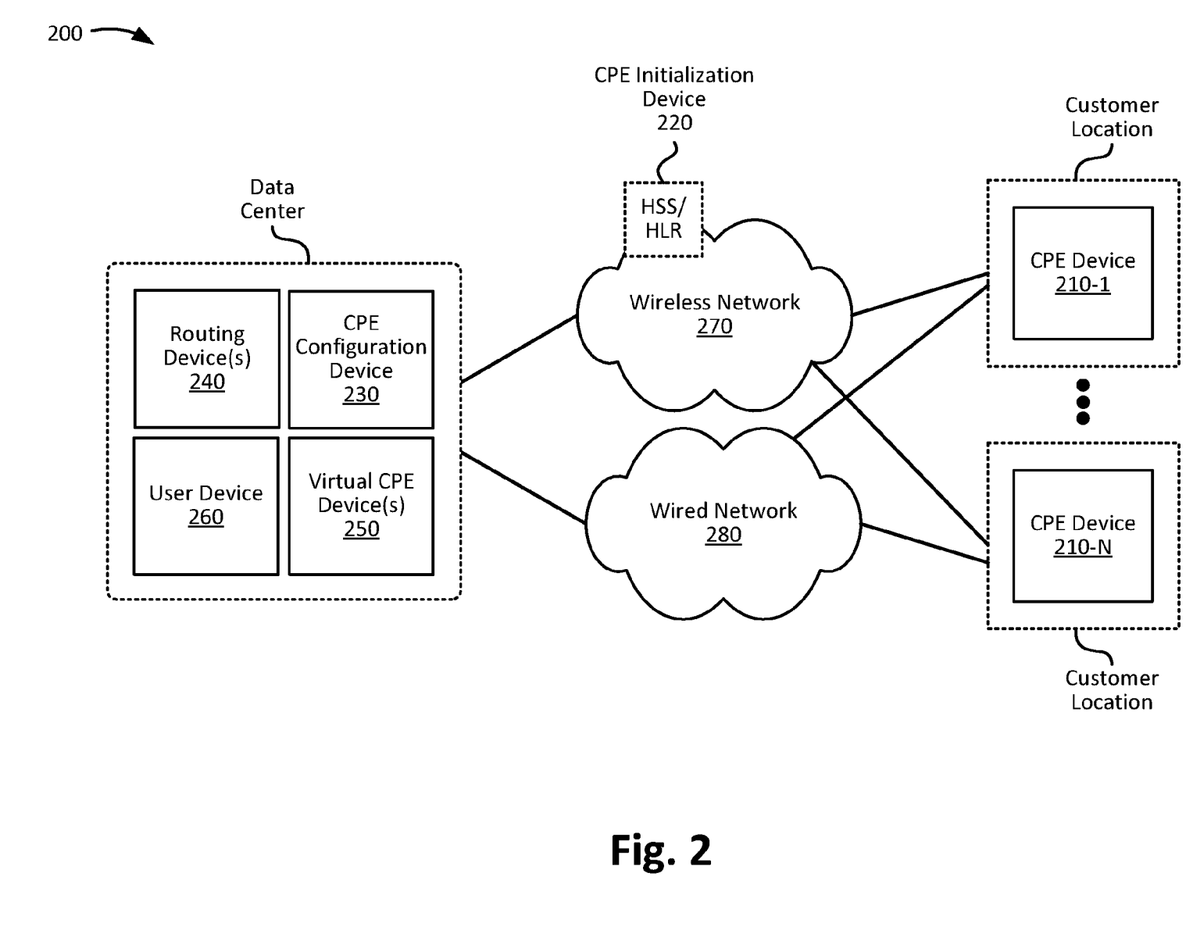
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include CPE devices 210-1 through 210-N (where N is an integer greater than or equal to 1), and a CPE initialization device 220, and a data center. The data center may include a CPE configuration device 230, a routing device 240, a virtual CPE device 250, and a user device 260. One or more networks may connect the various devises shown in FIG. 2, such as a wireless network 270 and a wired network 280.

CPE device 210 may include a network device that provides services relating to the network infrastructure of an entity. For example, CPE device 210 may provide services relating to network connectivity, security, data storage or caching, etc. Examples of common CPE devices 210 may include routers, firewall devices, NAT devices, CDN devices, virtual private network (VPN) devices, etc. CPE devices for a particular entity may be distributed at a number of different physical locations (e.g., offices) to form a CPE network for the entity.

For example, CPE devices at different physical locations may implement VPN connections with the different physical locations to form a secure private network over unsecure communication links (e.g., over the Internet or over another network). For example, CPE devices at different physical locations may implement VPN connections with the different physical locations to form a secure private network over unsecure communication links (e.g., over the Internet or over another network). Additionally, or alternatively, CPE device 210 may be connected to one or more other local devices. For instance, the customer location may include one or more personal computing or communication devices (e.g., a desktop computer, a laptop computer, a tablet computer, a smartphone, a telephone, etc.) that are connected to CPE device 210. In some implementations, CPE device 210 may be part of a private network involving multiple CPE devices 210 located at different physical locations. CPE device 210 may be managed/installed by another entity, such as the entity that controls the data center and/or that manages wireless network 270 and/or wired network 280.

As described herein, CPE devices 210 may be capable of self-installing in response to receiving power (e.g., being plugged in and/or turned on). Power may be received from an electrical outlet connected to an electrical grid, an external battery supply connected to CPE device 210, an internal battery supply within CPE device 210, etc. Additionally, or alternatively, CPE devices 210 may be capable of logically combining a connection with a wireless network with a connection with a wired network (each of which may be represented by network 270). CPE devices 210 may also, or alternatively, be capable of detecting a power failure relating to the power supply and reporting the power failure to CPE configuration device 230.

CPE initialization device 220 may include one or more computing devices, such as a server device or a collection of server devices to register CPE device 210 with wireless network 270. For instance, CPE initialization device 220 may include a home location register (HLR) device of a global system for mobile communication (GSM) network, a home subscriber server (HSS) of a long-term evolution (LTE) network, or another type of network device. CPE initialization device 220 may register CPE device 210 with a wireless network and/or (with the assistance of CPE configuration device 230) register CPE device 210 with a CPE network.

CPE configuration device 230 may include one or more computing devices, such as a server device or a collection of server devices to manage and configure CPE devices 210. As mentioned above, CPE configuration device 230 may register CPE device 210 with a CPE network. Additionally, or alternatively, CPE configuration device 230 may distribute CPE configuration data that controls how CPE devices 210 behave and operate within a CPE network. In some implementations, CPE configuration device 230 may enable a network administrator to access, edit, and/or delete CPE configuration data via user device 260. Additionally, or alternatively, CPE configuration application 235 may enable a network administrator to configure routing device 240, create and configure virtual CPE devices 250, and more.

Routing device 240 may include one or more networking devices, such as a switch, a router, or another type of networking device. Routing device 240 may operate as a backbone to a CPE network. In some implementations, routing device 240 may include a distinct physical device. However, in other implementations, routing device 240 may include a virtual device within a server device (e.g., CPE configuration device 230) or another device at a data center.

Virtual CPE device 250 may each represent functionality associated with a "standard" CPE device that may conventionally be installed at the customer locations. For example, a virtual CPE device 250 may be a virtual firewall device, a virtual NAT device, a CDN device, and/or one or more other types of virtualized CPE devices. Each virtual CPE device 250 may be implemented in software (e.g., on a general purpose computer), in specialized hardware (e.g., on a physical version of the CPE device), or both. CPE device 210 may be configured (via CPE configuration device 230) to communicate information to virtual device 250, such that CPE device 210 or an entire CPE network receives the network service provided by virtual device 250. Virtual CPE device 250 may be created within a server device (e.g., CPE configuration device 230) or another type of physical device at the data center.

User device 260 may include a desktop computer, a laptop computer, a tablet computer, a smartphone, or another type of computing device that is used by an administrator, or other employee associated the data center, to interact with and/or control other devices in the data center. For instance, user device 260 may communicate with CPE configuration device 230 to manage and/or edit CPE configuration data for CPE devices 210. Additionally, or alternatively, user device 260 may manage and configure a CPE network by communicating with routing device 240. User device 260 may also, or alternatively, create and manage virtual CPE devices 250 (e.g., via CPE configuration device 230). While user device 260 is depicted in FIG. 2 as being part of the data center, in some implementations, user device 260 may be located outside of the data center. For instance, user device 260 may be located at a customer location and may enable a customer to perform one or more of the user device operations described herein.

Wireless network 270 may include a cellular network (e.g., a second generation (2G) network, a third generation (3G) network, a fourth generation (4G) network, a fifth generation (5G) network, an LTE network, a GSM network, a code division multiple access (CDMA) network, an evolution-data optimized (EVDO) network, or the like), a public land mobile network (PLMN), and/or another network. Wired network 280 include a local area network (LAN), a wireless LAN (WLAN), a wide area network (WAN), a metropolitan network (MAN), the Public Switched Telephone Network (PSTN), an ad hoc network, a managed IP network, a virtual private network (VPN), an intranet, the Internet, a fiber optic-based network, and/or a combination of these or other types of networks.

The quantity of devices and/or networks in environment 200 is not limited to what is shown in FIG. 2. In practice, environment 200 may include additional devices and/or networks, fewer devices and/or networks, different devices and/or networks, or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
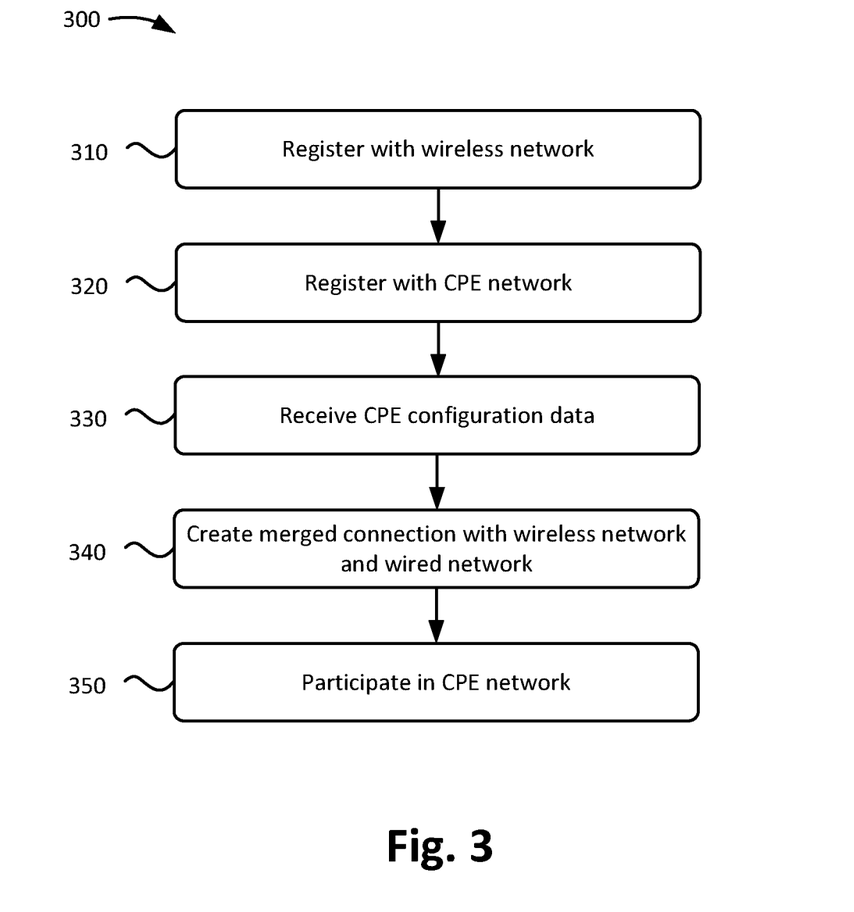
FIG. 3 illustrates a flowchart of an example process for installing a CPE device.

FIG. 3 illustrates a flowchart of an example process 300 for installing CPE device 210. In some implementations, process 300 may be performed by CPE device 210. In some implementations, some or all of the blocks of process 300 may be performed by one or more other devices. Process 300 may be performed automatically in response to CPE device 210 being initially powered-on (e.g., plugged in) at a customer location.

Process 300 may include registering with a wireless network (block 310). For example, CPE device 210 may register with a cellular wireless network, such as an LTE network, a GSM network, or another type of cellular wireless network. In some implementations, CPE device 210 may register with the wireless network by communicating identification and/or authentication information to a CPE initialization device 220 (e.g., an HLR device, an HSS device, etc.) of the wireless network.

Process 300 may include registering with a CPE network (block 320). For instance, CPE device 210 may register with a CPE network server such as CPE configuration device 230. In some implementations, CPE device 210 may register with the CPE network by communicating identification and/or authentication information to CPE configuration device 230. For instance, CPE device 210 may register with the CPE network by communicating a media access control (MAC) address and/or an international mobile station equipment identity (IMEI) to CPE configuration device 230. In such scenarios, CPE device 230 may match the identification information with identification information already stored by CPE configuration device 230 and identify network permission, network parameters, and/or another type of network information associated with the identification information. The identification information may have been entered into CPE configuration device 230 prior to sending and/or deploying CPE device 210 at the customer location.

In some implementations, CPE device 210 may register with the wireless network and the CPE network using distinct sets of communications. For instance, CPE device 210 my first register with the wireless network and then register with the CPE network after the registration with the wireless network is complete. However, in other implementations, CPE device may combine the registration with the wireless network and the registration with the CPE network. For instance, CPE network may communicate a registration request to the wireless network that includes identification and/or authentication information for registering with both the wireless network and the CPE network. In such a scenario, the wireless network may register CPE device 210 for both the wireless network and the CPE network (e.g., with the assistance of CPE configuration device 230) based on the information provided by CPE device 210.

Process 300 may include receiving CPE configuration data (block 330). For instance, CPE device 210 may receive CPE configuration data from CPE configuration device 230. In some implementations, CPE device 210 may automatically receive the CPE configuration data in response to registering with the CPE network. The CPE configuration data may include rules and parameters for controlling routing, encryption, or other functions of CPE device 210. In some implementations, CPE device 210 may automatically self-configure based on the CPE configuration data received from CPE configuration device 230. In some implementations, self-configuring may include updating or provisioning one or more settings to enable CPE device 210 to begin communicating with a wired network once the wired network becomes available. For instance, even if a wired network connection at the time CPE device 210 self-configures, CPE device 210 may self-configure in order to establish and begin using a wired connection once a wired connection becomes available.

Process 300 may include creating a merged connection with wireless network 270 and wired network 280 (block 340). For instance, CPE device 210 may establish one connection with a wireless network (e.g., by registering with the wireless network), establish another connection with a wired network (e.g., in response to receiving certain CPE configuration data from CPE configuration device 230), and logically merge the wireless connection with the wired connection for networking purposes. In some implementations, CPE device 210 may merge the wireless connection with the wired connection by using only one Internet Protocol (IP) address for both connections. This may include wireless network 270 and wired network 280 assigning CPE device 210 the same IP address for both connections. In some implementations, this may be implemented by using one or more routing methodologies, such as Multicast, Anycast, etc., such that network devices external to CPE device 210 will not realize that there are wireless and a wired connections serving a single CPE device 210.

Process 300 may include participating in the CPE network (block 350). For example, CPE device 210 may participate in the CPE network in accordance with the CPE configuration data received from CPE configuration device 230. In some implementations, participating in the CPE network may include communicating network traffic to CPE configuration device 230, routing device 240, virtual CPE devices 250, and/or other physical CPE devices 210 in the CPE network.

While FIG. 3 shows a flowchart diagram of an example process 300 for installing and operating CPE device 210, in other implementations, a process for installing CPE device 210 may include fewer operations, different operations, differently arranged operations, and/or additional operations than depicted in FIG. 3.

Figure 4:
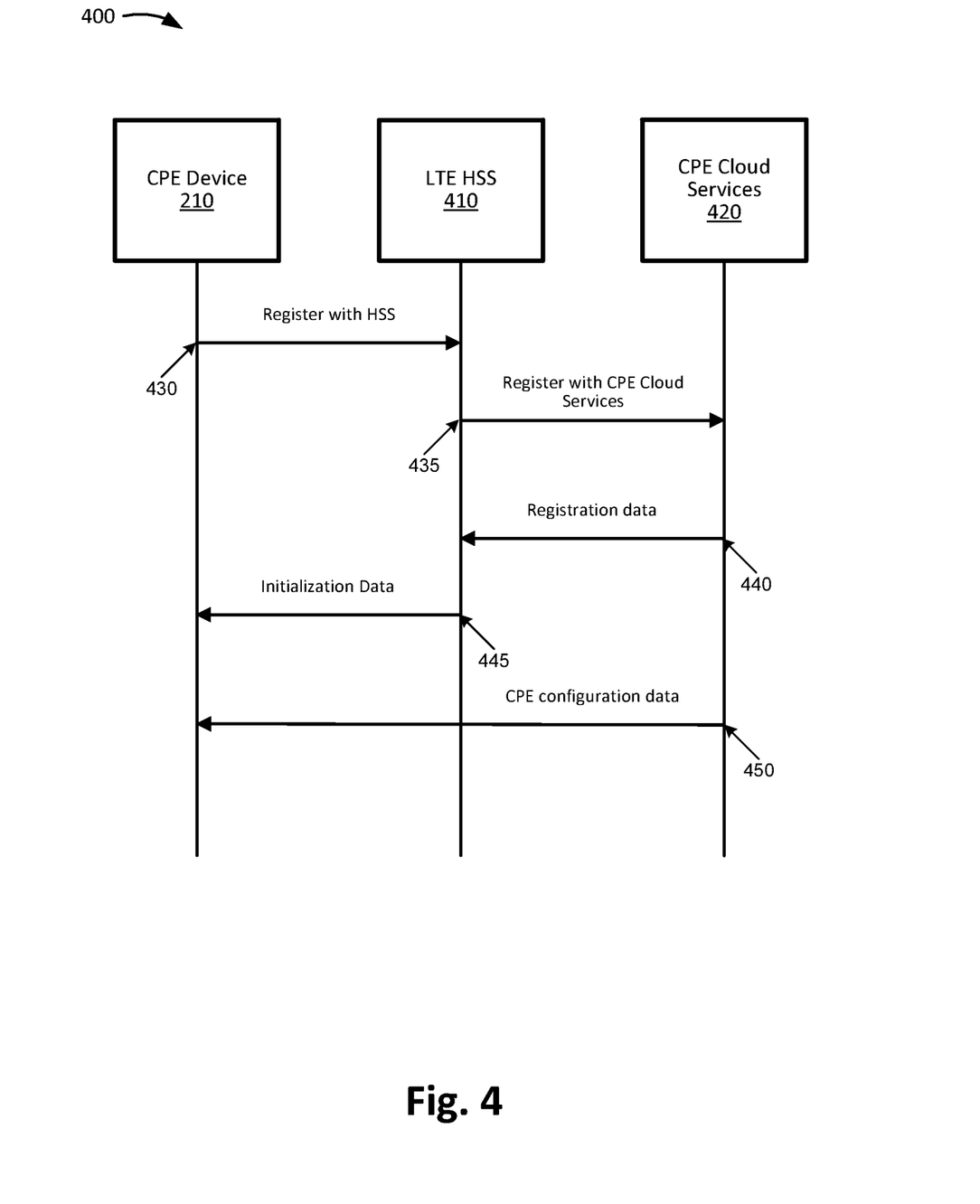
FIG. 4 illustrates a sequence flow diagram of an example process for installing a CPE device.

FIG. 4 illustrates a sequence flow diagram of an example process 400 for installing CPE device 210. As shown, CPE device 210 may communicate a request to register with LTE HSS 420 (line 410). LTE HSS 420 may be an example of CPE initialization device 220 in an LTE network. The request may include information (e.g., a MAC address, an IMEI, etc.) for registering CPE device 210 with the LTE network and CPE cloud services 420. CPE cloud services 420 may be an example of CPE configuration device 230. CPE device 210 may communicate the request in response to being powered on (e.g., being plugged into an electrical outlet).

LTE HSS 410 may register CPE device 210 with the LTE network and with CPE cloud services 420 (line 435) based on the information in the request from CPE device 210. CPE cloud services 420 may return registration data in response to registering CPE device 210 (line 440), and in turn, LTE HSS 410 may communicate initialization data to CPE device 210 (line 445). CPE configuration data may then be communicated (e.g., pushed) to CPE device 210 from CPE cloud services 420 (block 450). The CPE configuration data may cause CPE device 210 to self-configure, thereby enabling CPE device 210 to begin communicating with other CPE devices (not shown) in the CPE network. As such, CPE 210 may be capable of automatically self-installing in response to being powered on.

While FIG. 4 shows a sequence flow diagram of an example process 400 for installing CPE device 210, in other implementations, a process for installing CPE device 210 may include fewer operations, different operations, differently arranged operations, and/or additional operations than depicted in FIG. 4.

Figure 5:
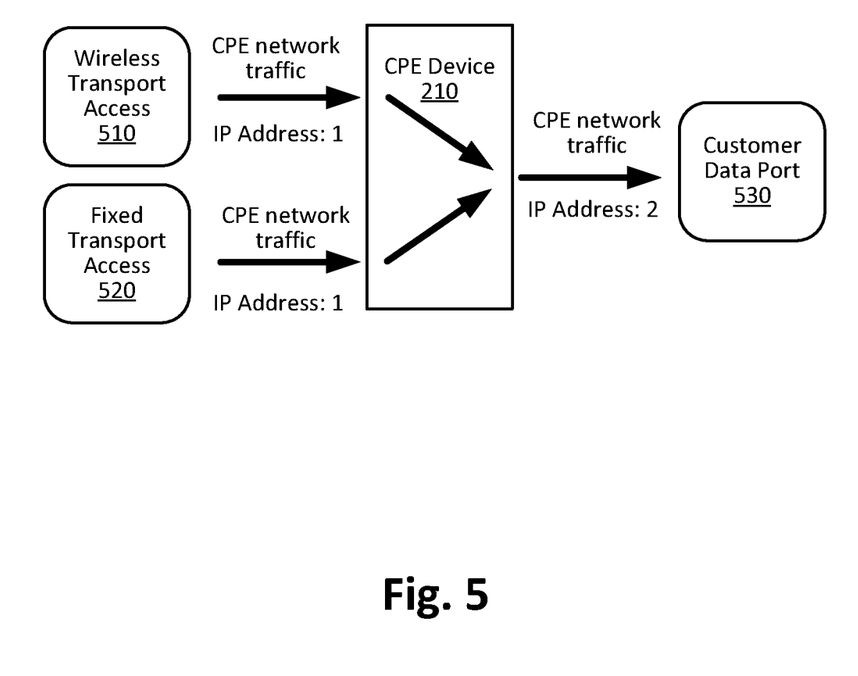
FIG. 5 illustrates a diagram of example network connections of a CPE device.

FIG. 5 illustrates a diagram of example network connections of CPE device 210. As shown, CPE device 210 may simultaneously receive CPE network traffic via wireless transport access 510 (e.g., from a wireless cellular network) and fixed transport access 520 (e.g., from a wired network). The connection for wireless transport access 510 and the connection for fixed transport access 520 may be logically combined by using the same IP address for each connection (e.g., IP Address 1) and implementing a routing methodology, such as Multicast, Anycast, etc. A second IP address may be used to communicate with one or more devices (e.g., desktop computers, laptop computer, etc.) via a local network at the same customer location as CPE device 210 (represented by IP Address: 2 and customer data port 530).

Figure 6:
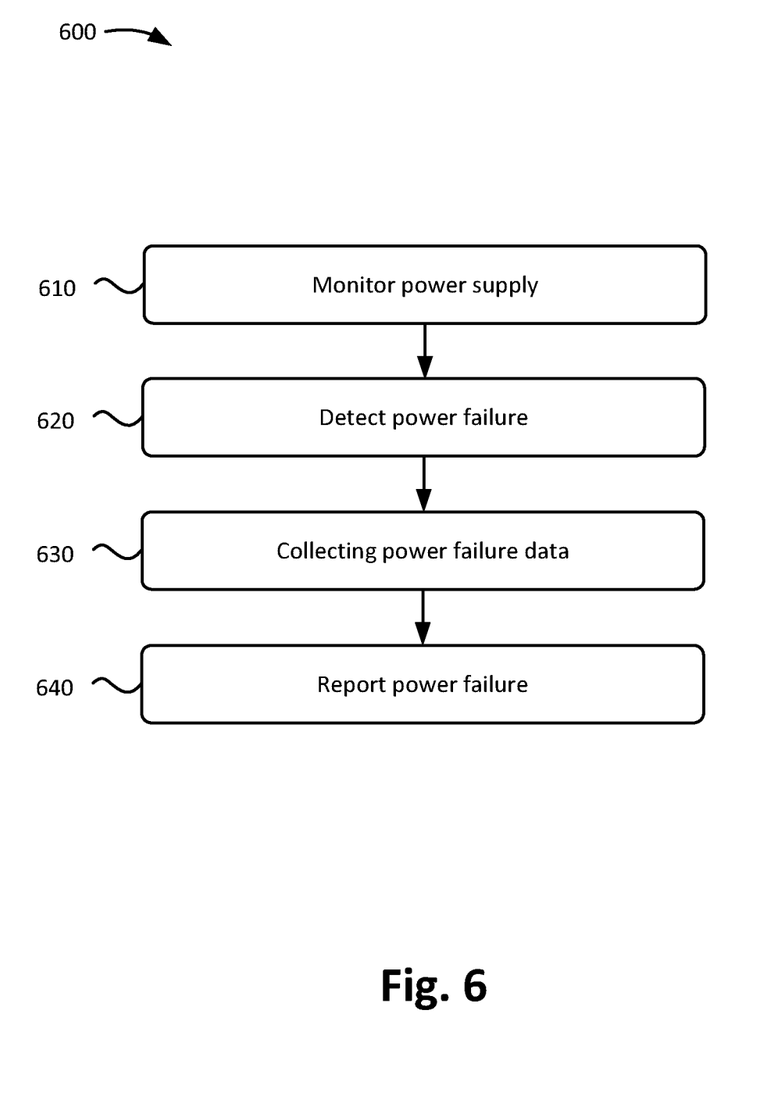
FIG. 6 illustrates a flowchart of an example process for responding to a power failure.

FIG. 6 illustrates a flowchart of an example process 600 for responding to a power failure. In some implementations, process 600 may be performed by CPE device 210. In some implementations, some or all of the blocks of process 600 may be performed by one or more other devices.

Process 600 may include monitoring a power supply (block 610). For example, CPE device 210 may be capable of monitoring the power supplied to CPE device 210. The power may be supplied from, for example, an electrical outlet that CPE device 210 is plugged into, a battery that is external to CPE device 210, or a battery that is internal to CPE device 210. CPE device 210 may monitor the supplied power by continually measuring the current and/or other aspects of the electricity powering CPE device 210.

Process 600 may include detecting a power failure (block 620). For instance, CPE device 210 may detect a power failure corresponding to the power supply. The power failure may include one or more events that may depend on a particular implementation. For instance, a power failure may include the current that is powering CPE device 210 dropping below a pre-selected current threshold. Additionally, or alternatively, detecting a power failure may cause changes to the functionality of CPE device 210, such as CPE device 210 losing network connectivity with the wireless network and/or the wired network, data packets failing to be sent, etc.

Process 600 may include collecting power failure data (block 630). For example, in response to detecting a power failure, CPE device 210 may gather information describing conditions within CPE device 210 at or around the time of the power failure. Examples of power failure data may include a timestamp corresponding to the power failure, stateful information inside the CPE device, a measurement of the electrical current, connection status information, information stored by CPE device 210 for reporting the power failure (e.g., an IP address of CPE configuration device 230), settings or preferences for reporting the power failure, etc. In some implementations, CPE device 210 may arrange the power failure data according to a pre-selected format or another type of arrangement for presenting the power failure data. CPE device 210 may include an onboard backup power supply (such as a battery or capacity supply) that allows the CPE device to continue to operate for a period long enough to perform blocks 620-640.

Process 600 may include reporting the power failure (block 640). For example, CPE device 210 may communicate an indication of the power failure to CPE configuration device 230 or another device associated with CPE cloud services. In some implementations, CPE device 210 may report the power failure via one or more networks. For instance, CPE device 210 may determine whether connections are still available via a wireless network and/or a wired network and report the power failure based on which connections are available. In scenarios where both a wireless connection and a wired connection are available, CPE device 210 may report the power failure via both connections or according to whichever connection has been preselected as a preferred connection for reporting the power failure.

While FIG. 6 shows a flowchart diagram of an example process 600 for responding to a power failure, in other implementations, a process for responding to a power failure may include fewer operations, different operations, differently arranged operations, and/or additional operations than depicted in FIG. 6.

Figure 7:
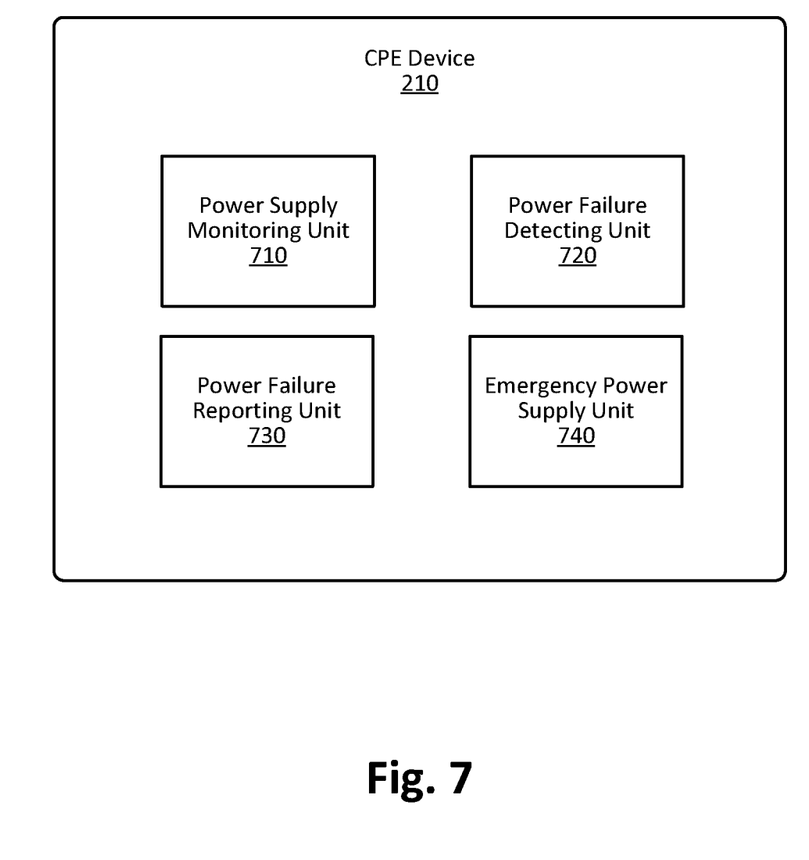
FIG. 7 illustrates a functional block diagram of an example CPE device.

FIG. 7 illustrates a block diagram of an example CPE device 210. As shown in FIG. 7, CPE device 210 includes a power supply monitoring unit 710, a power failure detecting unit 720, a power failure reporting unit 730, and a local power supply 740. Units 710-740 are provided for explanatory purposes and may be implemented using any combination of hardware and/or software. Additionally, while FIG. 7 shows a block diagram of an example CPE device 210, in other implementations, a CPE device 210 may include fewer units, different units, differently arranged units, and/or additional units than depicted in FIG. 7. For instance, CPE device 210 may logically include additional units for performing one or more additional functions or operations described herein as being performed by CPE device 210.

Power supply monitoring unit 710 may function to monitor an electrical current from a power supply by constantly measuring the electrical current. Power supply monitoring unit 710 may provide the measurements to power failure detecting unit 720 that may determine whether a power failure has occurred by determining whether the electrical current has dropped below a pre-selected current threshold. Power failure detecting unit 720 may notify power failure reporting unit 730 in response to detecting a power failure.

Power failure reporting unit 730 may collect power failure information that describes the power failure itself and/or conditions within CPE device 210 at the time of the power failure (e.g., timestamp information, connection availability, etc.). Additionally, or alternatively, power failure reporting unit 730 may create a message for reporting the power failure information and/or communicate the power failure data to an external device, such as CPE configuration device 230. In some implementations, power failure reporting unit 730 may be capable of determining whether a particular connection (e.g., a wireless connection or a wired connection) is available for reporting the power failure and reporting the power failure based on connection availability.

Emergency power supply unit 740 may provide electrical power to CPE device 210 during the power failure. For example, emergency power supply unit 740 may provide power to CPE device 210 so that power failure detecting unit 720 and power failure reporting unit 730 perform their respective functions. Additionally, or alternatively, emergency power supply unit 740 may provide power to CPE device 210 so that connections with a wireless network and/or a wired network are maintained while power failure reporting unit 730 reports the power failure to CPE configuration device 230. Emergency power supply unit 740 may include an on-board battery, a capacitor, etc.

Figure 8:
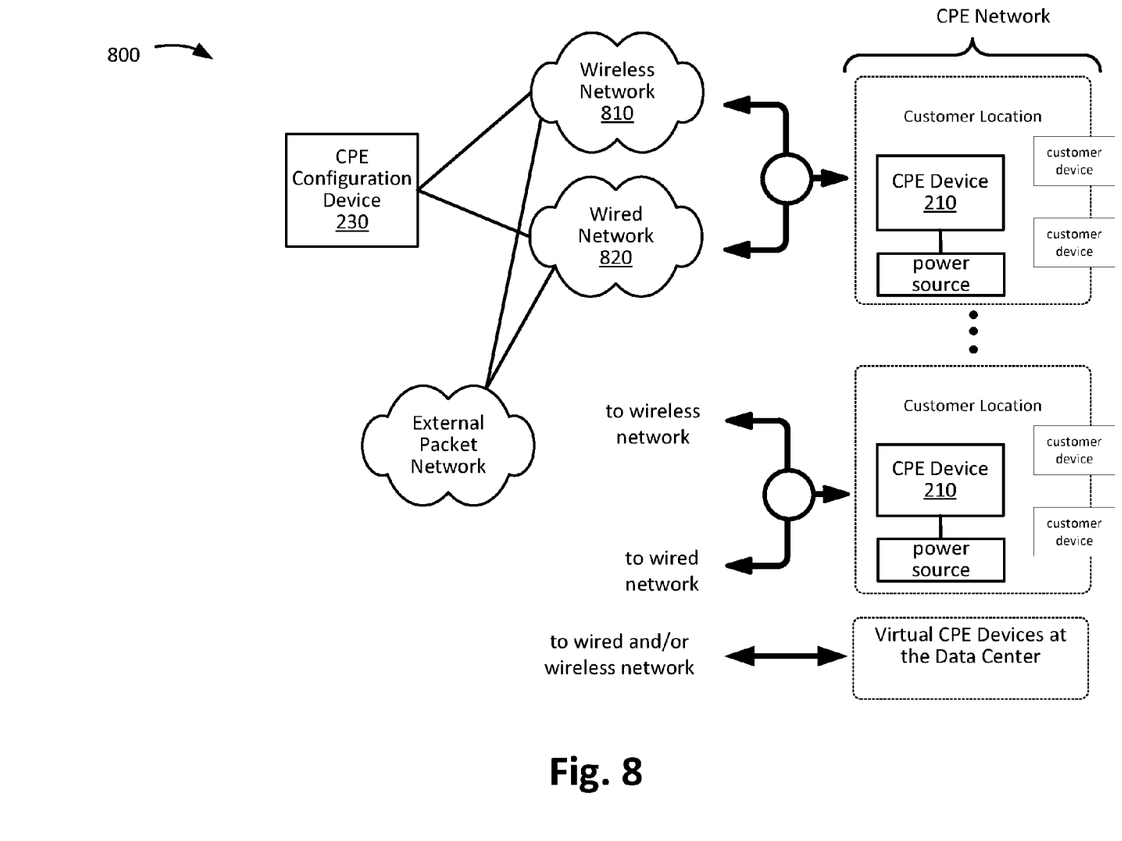
FIG. 8 illustrates a diagram of an example of a CPE network.

FIG. 8 illustrates a diagram of an example of a CPE network 800. As shown, CPE device 210 may be connected to a power source (e.g., an electrical grid, a battery, etc.) and perform a self-installation process in response to powering on. The self-installation process may include automatically registering with wireless network 810 and CPE configuration device 230. For example, the self-installation may include automatically registering, when CPE device 210 is initially powered on, with wireless network 810. Because the wireless network may be a network with a wide geographic score (e.g., a national cellular network), CPE devices 210 can be provisioned (e.g., during manufacture) to automatically connect and register with the wireless network. The wireless network may, in response to registration of CPE device 210 with the wireless network, automatically trigger registration of CPE device 210 with the CPE network. In response to CPE device 210 registering, CPE configuration device 230 may communicate CPE configuration data to CPE device 210, which may cause CPE device 210 to self-configure based on the CPE configuration data. Self-configuring may enable CPE device 210 to communicate with one or more other CPE devices 210 at one or more other customer locations 830, in accordance with the CPE configuration data received from CPE configuration device 230. At some point, CPE device 210 may be updated by receiving updated CPE configuration data from CPE configuration device 230.

CPE device 210 may communicate with CPE network 800 via a connection with wireless network 810 and wired network 820. In some implementations, one type of connection may act as a primary connection while the other type of connection may act as a backup connection. For instance, if the primary connection fails or becomes unavailable, CPE device 210 may begin communicating via the backup connection. In other implementations, the wireless connection and the wired connection may be logically combined and used simultaneously by assigning the same IP address to both the wireless connection and the wired connection (or by the wired and wireless networks assigning the same IP address to CPE device 210). In such a scenario, CPE device 210 may benefit from having two connection simultaneously (e.g., greater reliability, more bandwidth, etc.) while appearing to have only having one connection (e.g., one IP address) to external devices.

Additionally, or alternatively, CPE device 210 may be capable of detecting and reporting power failures. For instance, CPE device 210 may monitor a current received from a power source and detect a power failure when the current drops below a preselected current threshold. CPE device 210 may also, or alternatively, collect power failure data that indicates that a power failure has occurred and/or that describes the state of the CPE device 210 at the time of the power failure. CPE device 210 may report the power failure to a device within CPE network 800, such as CPE configuration device 230. Doing so may enable a network administrator or technical support specialist to promptly determine what has occurred to CPE device 210 and respond appropriately.

Figure 9:
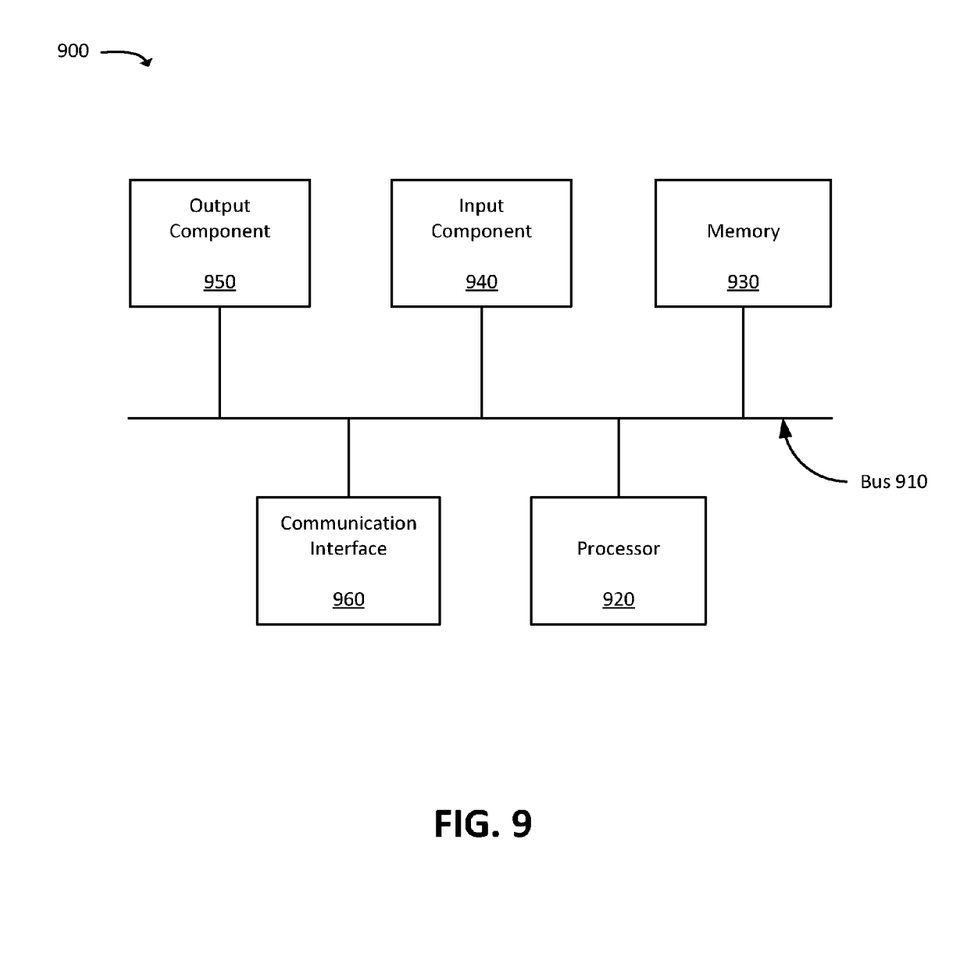
FIG. 9 illustrates example components of one or more devices, according to one or more implementations described herein.

FIG. 9 is a diagram of example components of device 900. One or more of the devices described above (e.g., with respect to FIGS. 1A-1C, 2, 4, 5, 7 and 8) may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes (LEDs), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks has been described with regard to one or more figures described herein, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIG. 2), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. The term "greater than" (or similar terms), as used herein to describe a relationship of a value to threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms, depending on the context in which the threshold is used.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A customer premise equipment (CPE) device at a physical customer location, the CPE device comprising:
    a wireless interface to a wireless cellular network;
    a wired interface to a wired network; and
    processing circuitry to:
        register, via the wireless interface, with the wireless cellular network automatically in response to said CPE device powering on, and
        receive (i) a first set of configuration information from an initialization device of the wireless cellular network and (ii) a second set of configuration information from a configuration device of a private network formed by a plurality of other CPE devices via the wireless interface and in response to the registration with the wireless cellular network, the first set of configuration information providing the CPE device with access to the wireless cellular network and relating to provisioning the CPE device with the wired network, and the second set of configuration information comprising rules and parameters providing the CPE device connectivity and registered communication with the plurality of other CPE devices of the private network, where the plurality of other CPE devices are located at a plurality of other physical customer locations;
        provision with the wired network and based on the first set of configuration information, to connect to the wired network, and
        self-configure, based on and in response to the second set of configuration information, with the plurality of other CPE devices via the private network, wherein said self-configuring adds the CPE device as one of a firewall, Network Address Translation (NAT) device, or content delivery network (CDN) device of the private network, wherein the CPE device is configured to communicate with the plurality of other CPE devices via the wired network in response to said self-configuring, and
        logically combine a connection with the wireless network with a connection with the wired network by using a single Internet Protocol (IP) address for the connection with the wireless network and the connection with the wired network based on the first set of configuration information.

2. The CPE device of claim 1, wherein network traffic is communicated to the logically combined connections via a multicast routing methodology or an anycast routing methodology.

3. The CPE device of claim 1, further comprising processing circuitry to:
    monitor a power source used to power the CPE device;
    detect a power failure corresponding to the power source; and
    report the power failure to the configuration device of the private network.

4. The CPE device of claim 3, wherein, to report the power failure, the processing circuitry is to:
    gather power failure information representing one or more conditions of the CPE device at the time of the power failure; and
    communicate the power failure information to the configuration device of the private network.

5. The CPE device of claim 1, wherein the wireless cellular network includes a longterm evolution (LTE) network and the CPE device registers with a home subscriber server (HSS) of the LTE network.

6. A method implemented by a customer premise equipment (CPE) device located at a customer location, the method comprising:
    registering, by the CPE device and via a wireless interface, with a wireless cellular network automatically in response to said CPE device powering on, and
    receiving, by the CPE device, (i) a first set of configuration information from an initialization device of the wireless cellular network and (ii) a second set of configuration information from a configuration device of a private network formed by a plurality of other CPE devices, via the wireless interface and in response to the registration with the wireless cellular network, the first set of configuration information providing the CPE device with access to the wireless cellular network and relating to provisioning the CPE device with a wired network, and the second set of configuration information comprising rules and parameters providing the CPE device connectivity and registered communication with the plurality of other CPE devices of the private network, where the plurality of other CPE devices are located at a plurality of other physical customer locations;

provisioning, by the CPE device and via a wired interface, with the wired network and based on the first set of configuration information, to connect to the wired network, and self-configuring, by the CPE device, based on and in response to the second set of configuration information, with the plurality of other CPE devices via the private network, wherein said self-configuring adds the CPE device as one of a firewall, Network Address Translation (NAT) device, or content delivery network (CDN) device of the private network, wherein the CPE device is configured to communicate with the plurality of other CPE devices via the wired network in response to said self-configuring, and logically combining a connection with the wireless network with a connection with the wired network by using a single Internet Protocol (IP) address for the connection with the wireless network and the connection with the wired network based on the first set of configuration information.

7. The method of claim 6, wherein network traffic is communicated to the logically combined connections via a multicast routing methodology or an anycast routing methodology.

8. The method of claim 6, further comprising:
monitoring a power source used to power the CPE device;
detecting a power failure corresponding to the power source; and
reporting the power failure to the configuration device of the private network.

9. The method of claim 8, wherein reporting the power failure comprises:
gathering power failure information representing one or more conditions of the CPE device at the time of the power failure; and
communicating the power failure information to the configuration device of the private network.

10. The method of claim 6, wherein the wireless cellular network includes a long-term evolution (LTE) network and the CPE device registers with a home subscriber server (HSS) of the LTE network.

11. The method of claim 6, further comprising:
in response to self-configuring based on the second set of configuration information,
participating with the private network by communicating network traffic to one or more of the plurality of other CPE devices in accordance with the rules and parameters of the second set of configuration information.

* * * * *